(12) United States Patent
L'Hermite et al.

(10) Patent No.: US 6,177,782 B1
(45) Date of Patent: Jan. 23, 2001

(54) CIRCUIT AND METHOD OF CONTROLLING A REGULATOR WITH AN OUTPUT FEEDBACK SIGNAL AND DEVOID OF AN INPUT FEEDFORWARD SIGNAL

(75) Inventors: Francois L'Hermite, Lasserre; Joel Turchi, Toulouse, both of (FR)

(73) Assignee: Semiconductor Components Industries, LLC, Phoenix, AZ (US)

( * ) Notice: Under 35 U.S.C. 154(b), the term of this patent shall be extended for 0 days.

(21) Appl. No.: 09/298,753

(22) Filed: Apr. 23, 1999

(51) Int. Cl.⁷ .................................................. G05F 1/10
(52) U.S. Cl. .................................. 323/222; 323/217
(58) Field of Search .................................. 323/222, 217, 323/212

(56) References Cited

U.S. PATENT DOCUMENTS

| | | |
|---|---|---|
| 5,289,461 | 2/1994 | Vinciarelli . |
| 5,359,278 * | 10/1994 | Notohara et al. .................. 323/222 |
| 5,406,192 | 4/1995 | Vinciarelli . |
| 5,568,041 * | 10/1996 | Hesterman ........................ 323/222 |
| 5,592,128 | 1/1997 | Hwang ................................ 331/61 |
| 5,644,214 * | 7/1997 | Lee .................................... 323/222 |
| 5,650,925 | 7/1997 | Hesterman ........................ 363/132 |
| 5,661,394 | 8/1997 | Nakao et al. ..................... 323/222 |
| 5,689,176 | 11/1997 | Deloy ................................ 323/222 |
| 5,790,395 * | 8/1998 | Hagen ................................ 323/222 |
| 5,804,950 | 9/1998 | Hwang et al. . |
| 5,818,707 * | 10/1998 | Seong et al. ...................... 323/222 |
| 5,949,229 * | 9/1999 | Choi et al. ........................ 323/222 |

* cited by examiner

Primary Examiner—Shawn Riley
(74) Attorney, Agent, or Firm—Robert D. Atkins

(57) ABSTRACT

A power factor correction controller circuit 100 for controlling the duration of each on time phase and off time phase of a switched inductor power factor correction circuit 20, 30, 40, 50, 100 which is adapted for use with a rectifying arrangement 9, 10, 60, 70 producing a substantially regulated output voltage, Vo. The controller circuit 100 comprises an input terminal 114 for receiving a signal representative of Vo; an output terminal 131 for outputting a signal representative of the duration of each on time phase and off time phase; and on time determination means 110, 111, 112, 113, 114, 115, 116, 117; wherein the on time determination means acts to vary the maximum duration of each on time phase in an inverse dependence on Vo.

3 Claims, 3 Drawing Sheets

CIRCUIT AND METHOD OF CONTROLLING A REGULATOR WITH AN OUTPUT FEEDBACK SIGNAL AND DEVOID OF AN INPUT FEEDFORWARD SIGNAL

FIELD OF THE INVENTION

The present invention relates to a power factor correction controller circuit.

BACKGROUND OF THE INVENTION

Power factor correction (pfc) circuits are typically used within power supply applications requiring ac/dc rectification. Rectifying arrangements for use in such an application may essentially comprise a full wave voltage rectifier, typically in the form of a diode bridge, and an output capacitor, to provide regulation of the output wave form. Such a rectifying arrangement, however, only draws current from the ac supply (typically a mains electricity supply) when the full wave rectified voltage is greater than the voltage across the output capacitor. This gives rise to an inefficient current profile of the input ac current consisting of separated narrow pulses of current having large peak values. This current profile has a high harmonic content and gives rise to a very low power factor (about 0.5–0.6) of the rectifying arrangement as a whole. The high harmonic content in turn gives rise to large line noise (typically reflected back onto the ac mains supply). Such a current profile, in addition to being inefficient, is also unacceptable under EC standard IEC1000-3-2.

A known solution to mitigate the problem of the inefficient current profile is to employ a pfc circuit which is inserted between the output capacitor and the diode bridge, and which essentially consists of an inductor followed by a diode with a switch connected between ground and between the inductor and the diode. By rapidly switching the switch on and off, current may be drawn from the input, full-wave rectified signal even when the input voltage is less than the output voltage. In fact, with such an arrangement the output voltage is always greater than the input voltage and for this reason such an arrangement is typically referred to as being in a boost configuration. Generally, the inductor, diode and switch arrangement may be termed a switched inductor pfc circuit and the circuit which controls the on and off times of the switch may be termed a pfc controller circuit.

With such an arrangement, each section of time when the switch is switched on to connect the inductor to ground may be termed an on time phase having an on time duration, $t_{ON}$, with a corresponding off time phase having an off time duration, $t_{OFF}$, occurring between each on time phase. A single cycle, having a period, $\tau$, comprises an on time phase together with an off time phase, the period $\tau$ being given by $\tau = t_{ON} + t_{OFF}$. Each cycle will repeat with a frequency given by $f = 1/\tau$ and the resultant on-off or pulse width modulated signal will have a duty cycle of $t_{ON}/\tau$.

A known pfc circuit of this nature operates by comparing the output voltage of the rectifying arrangement with a fixed reference voltage and controlling $t_{ON}$ to maintain the output voltage at a fixed level. This generally results in a large difference between the peak value of the input voltage (typically from the mains electricity supply) and the substantially regulated output voltage. This large difference between the peak value of the input voltage and the output voltage requires a correspondingly large inductor. Furthermore, for a given output power requirement the duty cycle of the switch arrangement must also be correspondingly large for a large difference between the input and output voltages.

Furthermore, it is known to operate a power factor correction circuit in what is termed a critical discontinuous mode in which $t_{OFF}$ is such that the switch is switched back on again as soon as the current flowing through the inductor falls to substantially zero. In order to do this, conventional controllers measure the voltage across an additional winding which is coupled to the switched inductor, which voltage switches when the current flow through the inductor falls to zero. However, the provision of the additional winding represents an expense which adds to the total cost of the power factor correction circuit.

The present invention seeks to provide a power factor correction controller circuit which at least mitigates one or more of the disadvantages of a conventional pfc circuit as discussed above.

SUMMARY OF THE INVENTION

According to a first aspect of the present invention, there is provided a power factor correction controller circuit for controlling the duration of each on time phase and off time phase of a switched inductor power factor correction circuit which is adapted for use with a rectifying arrangement producing a substantially regulated output voltage, Vo, said controller circuit comprising an input terminal for receiving a signal representative of Vo; an output terminal for outputting a signal representative of the duration of each on time phase and off time phase; and on time determination means; wherein the on time determination means acts to vary the duration of each on time phase in an inverse dependence on Vo.

By inverse dependence it is meant that as the output voltage Vo increases the duration of each on time reduces. The relation need not be directly inversely proportional (i.e. $y = 1/x$), but may, for example, be a complicated inverse quadratic relationship (e.g. $y = (ax^2 + bx + c)^{-1}$). Preferably the duration of each on time phase is inversely proportional to the square of the sum of Vo and an arbitrary off-set constant which may be positive, negative or zero (i.e. for an arbitrary off-set constant V, the on time duration is given by $t_{ON} = k/(Vo+V)^2$).

The controller circuit preferably further comprises a voltage regulator which acts to prevent the output voltage Vo from exceeding a predetermined maximum value. Ideally the voltage regulator is a low gain regulator. Preferably the voltage regulator acts to influence or over-ride the on time determination means to rapidly reduce the duration of each on time phase as Vo approaches the predetermined value.

Preferably the on time determination means comprises a signal generator for generating an increasing or decreasing signal and a comparator for comparing the increasing or decreasing signal with an on time reference signal and detecting when the increasing or decreasing signal exceeds or falls below the on time reference signal. Preferably the increasing or decreasing signal varies between an initial value at the start of each on time phase and the value of the on time reference signal at the end of each on time phase.

Preferably the increasing or decreasing signal varies at a rate which depends upon the magnitude of Vo (the rate of change of the signal being substantially the inverse of the maximum duration of each on time phase). The on time reference signal is preferably produced by the voltage regulator and preferably approaches the initial value of the increasing or decreasing signal as Vo approaches its predetermined maximum value.

In a preferred embodiment of the present invention, the signal generator comprises an on time capacitor the voltage across which increases from an initial value at a rate which depends upon Vo, and a voltage comparator which compares the voltage across the capacitor with an on time reference voltage generated by the voltage regulator. The signal generator also ideally includes an on time resistor connected to the output voltage Vo so as to generate a current signal whose value depends upon the value of Vo for charging the on time capacitor at the desired rate.

Preferably the signal representative of the duration of each on time phase and off time phase outputted from the output terminal is a pulse width modulated signal, the width of each pulse being representative of the duration of a corresponding on time phase.

According to a second aspect of the present invention, there is provided a power factor correction controller circuit for controlling the duration of each on time phase and off time phase of a switched inductor power factor correction circuit which is adapted for use with a rectifying arrangement producing a substantially regulated output voltage, Vo, said controller circuit including current measurement means for measuring the current flowing through the power factor correction circuit, said current measurement means comprising a voltage detection device for connection across an in-rush resistor to measure the voltage across the in-rush resistor and programmable means for enabling programmable over-current detection.

The term in-rush resistor is used here to refer to any low value resistive element connected in series with the rectifying arrangement such that current drawn from the ac power supply will flow through this resistive element. A low value resistive element such as this is generally found in rectifying arrangement having output capacitors in order to prevent dangerously large currents on startup when the capacitor is essentially uncharged.

It will be appreciated by a person skilled in the art that it may be desirable to use a plurality of resistive elements to form a global in-rush resistor; for example, it may be convenient to have a resistive element immediately downstream of the diode bridge and another resistive element between the ac power supply and the diode bridge in order to increase the global in-rush resistor.

The voltage detection device is preferably adapted for operation as a zero-current threshold detector for detecting, during the off time of the power factor correction circuit when in use, when the voltage across the in-rush resistor falls below a predetermined zero-current thresh old value representing substantially zero-current flow through the in-rush resistor.

Ideally, the voltage detection device is also adapted for operation as an over-current threshold detector for detecting, during each on time phase of the power factor correction circuit w hen in use, when the e voltage exceeds a predetermined over-current threshold value representing the maximum current which is to be permitted to flow through the power factor correction circuit. Having detected an over-current during an on time phase, the e voltage detection device preferably produces a signal which has the effect of terminating the on time phase.

According to a preferred embodiment of the second aspect of the present invention, the voltage detector comprises a comparator for comparing the voltage across the in-rush resistor with an in-rush reference voltage.

By using a relatively low magnitude in-rush reference voltage, the voltage detector is able to establish approximately when the current flow through the power factor correction circuit has fallen to almost zero regardless of the precise value of the in-rush resistor, at least to a sufficiently accurate degree for most applications.

Preferably, the programmable means comprises an over-current voltage-offset generator which may be switched on and off during the on time and off time (or vice-versa) of the power factor correction circuit when in use, for generating an over-current voltage-offset which may be added to or subtracted from either the voltage across the in-rush resistor or the in-rush reference voltage. In this way a single voltage comparator may be used as a threshold detector for detecting both the zero-current and over-current threshold values; the arrangement being such that the current measurement means acts to detect the zero-current threshold value during the off time, and the over-current threshold value during the on time, of the power factor correction circuit.

Preferably the over-current voltage-offset generator (and thus the programmable means) includes an over-current resistor, wherein the magnitude of the over-current voltage-offset depends up on the resistance of the over-current resistor, whereby the over-current detection threshold may be programmed by selecting the appropriate resistance of the over-current resistor. Preferably, the over-current resistor is connected between the in-rush resistor and the voltage detection device whereby the over-current voltage-offset is either added to or subtracted from the voltage across the in-rush resistor.

The pfc controller circuit according to the present invention may be formed as a single integrated circuit. However, it may also be desirable to allow one or more external components to form part of the pfc controller circuit. This has the advantage of enabling a single design of integrated circuit to be used in many different applications by simply adjusting the values of the external components as required. Components which may advantageously be provided as external components are the on time capacitor, the on time resistor and the over-current resistor.

BRIEF DESCRIPTION OF THE DRAWINGS

In order that the present invention may be better understood, an embodiment thereof will now be described, by way of example only, with reference to the accompanying drawings in which.

DETAILED DESCRIPTION OF A PREFERRED EMBODIMENT

Figure 1:
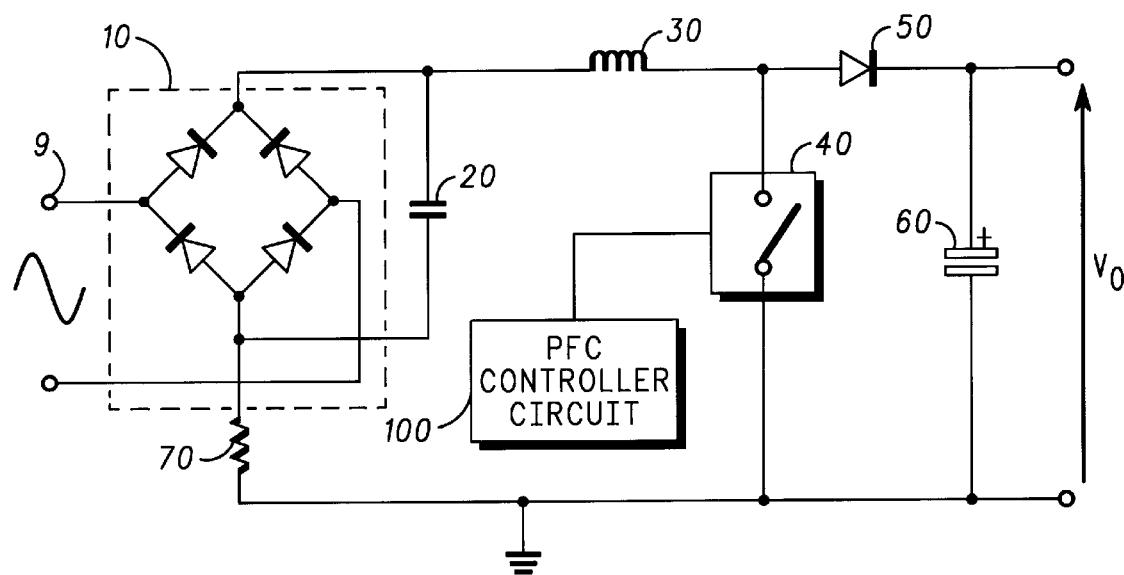
FIG. 1 is a schematic diagram of a switched inductor power factor correction circuit.

Referring to FIG. 1 a d.c. voltage providing circuit incorporating a switched inductor power factor correction (pfc) circuit is shown. The circuit comprises a rectifying arrangement 9, 10, 60, 70 and a switched inductor pfc circuit 20, 30, 40, 50, 100. The rectifying arrangement essentially comprises a pair of input terminals 9, a diode bridge 10, an output capacitor 60 across which the dc output voltage Vo is taken and an in-rush resistor 70.

The pfc circuit comprises a low value capacitor 20 to filter out unwanted high frequency noise inherently generated by the high frequency of the switching arrangement.

The circuit essentially operates as follows. An ac signal, typically from a mains electricity supply, is input across input terminals 9 and is full wave rectified by the diode bridge arrangement 10. Once the output capacitor 60 has been charged it acts to provide a reasonably well regulated dc voltage output signal Vo, during initial charge up of the capacitor 60 the relatively low value (of the order of a few ohms) in-rush resistor 70 acts to prevent excessive and damaging currents flowing around the circuit.

The pfc circuit acts to enable current to flow from the input throughout the entirety of the input ac signal instead of simply at the peaks of the ac signal as would be the case without the pfc circuit. By rapidly switching switch 40 the inductor 30 is repeatedly first connected directly to ground via the switch 40 when it is turned on (i.e. during each on time phase) and then connected only to the output capacitor 60 when the switch 40 is turned off (i.e. during each off time phase). During each on time phase the current flow $I_L$ through the inductor 30 builds up and, owing to the nature of inductors, during the subsequent off time phase, $I_L$ decreases at a finite rate effectively pushing current through diode 50 to charge output capacitor 60. Clearly, by adjusting the on and off times of the switch (by means of pfc controller circuit 100) the output voltage Vo may be adjusted, although the output voltage must always be higher than the input voltage because of the action of the diode 50 in conjunction with the boosting action of the switched inductor 40.

Figure 2:
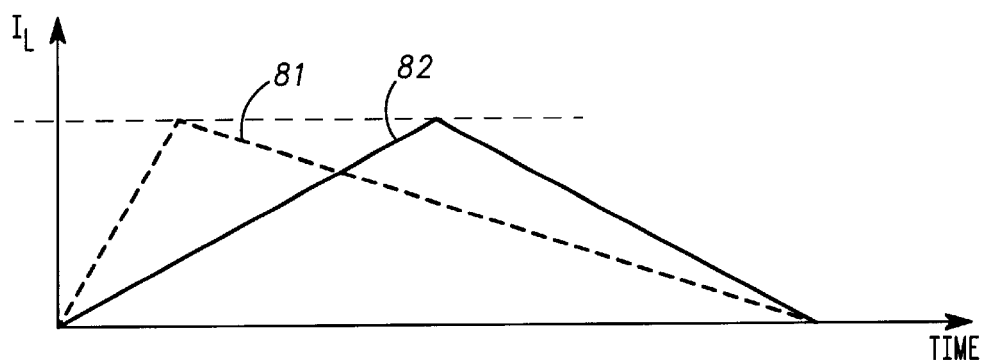
FIG. 2 is an illustrative graph of inductor current against time for a pfc circuit using a conventional controller and a pfc circuit using a controller according to the present invention.

Referring now to FIG. 2, lines 81 and 82 represent the flow of current through inductor 30 during a switching period τ (1 on time phase and 1 off time phase) for a pfc circuit controlled by a controller according to the present invention and a conventional controller circuit respectively. In both cases $I_L$ increases substantially linearly during the on time phase. The rate of increase of $I_L$ in both cases is given simply by:

$$\frac{dI_L}{dt} = \frac{V_{IN}}{L}$$

where $V_{IN}$ is the instantaneous voltage of the full-wave rectified signal from the diode bridge and L is the inductance of inductor 30.

Clearly this implies that the inductance of inductor 30 is greater for line 82 (the conventional case) than for line 81. When the switch is turned off, $I_L$ decreases linearly in both cases at a rate given by:

$$\frac{dI_L}{dt} = \frac{V_0 - V_{IN}}{L}$$

Since L is greater in the conventional case, but has a greater rate of decrease it implies that $V_0 - V_{IN}$ must be much less in the case of the present invention than in the conventional case.

In fact, in the conventional case Vo is maintained at some large fixed value, while in the present case Vo is allowed to vary in dependence upon the input peak voltage and the output power requirement so as to maintain $V_0 - V_{IN}$ at a desired lower value than in the conventional case, at least in the case of reasonably high output power requirements when there is most to be gained by minimising the difference between Vo and $V_{IN}$.

Figure 3:
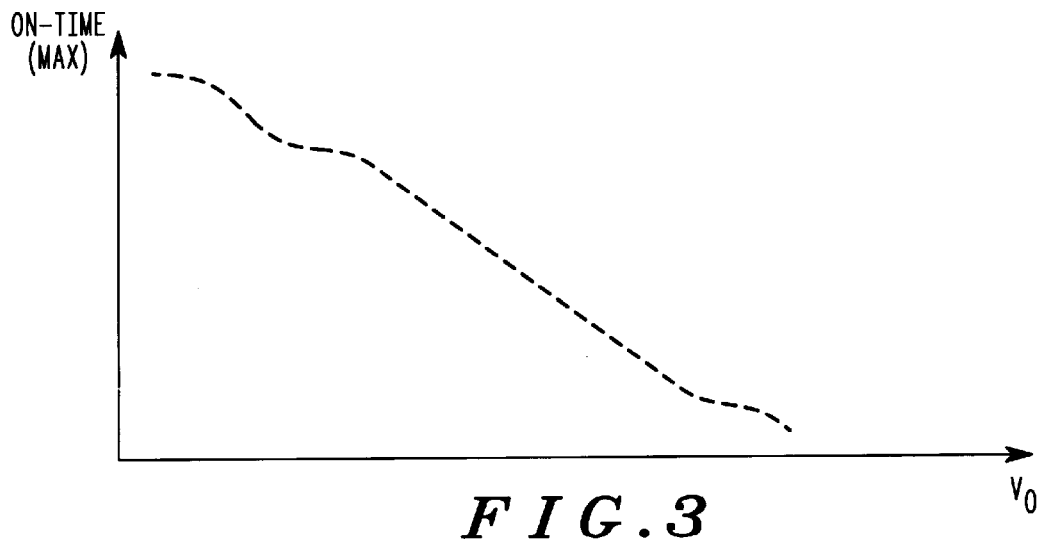
FIG. 3 is a graph of the maximum available on-time of a pfc circuit plotted against the substantially regulated output voltage, Vo, of the pfc circuit for a given inductor and power switch and a given maximum power output.

Turning now to FIG. 3, there is shown the relationship between the maximum available on-time (for a particular maximum power output) against Vo which results from choosing a particular preferred relationship between Vo and $V_{IN}$. By arranging for Vo and $t_{ON}$ to be tied together in approximately the way shown in FIG. 3, the preferred relationship between Vo and $V_{IN}$ can be maintained for a particular output power requirement. Of course, the relationship between Vo and $V_{IN}$ will not be the same for different (i.e. lower) output power requirements, but since the advantages to be gained by maintaining Vo and $V_{IN}$ close together only really apply to conditions of high output power requirements, this is no great loss. It can be seen that at low values of Vo one may have a greater on time (and thus supply a greater output power for a given input voltage) than at high Vo. By allowing Vo to vary and arranging for more power to be delivered at lower Vo (by arranging for an inverse dependence between Vo and the on time), the relationship shown in FIG. 3 between the maximum available on time as a function of Vo may be exploited to enable a smaller power transistor 40 to be used than would be the case if Vo were fixed at a relatively high level. In fact, the power loss via the power switch can be estimated as follows:

$$Pon \approx \frac{8}{3} \cdot Rdson \cdot \left(\frac{Pin}{Vpk}\right)^2 \cdot \left(1 - \left(\frac{0.85 \cdot Vpk}{Vo}\right)\right)$$

(where Rdson is the power transistor's resistance during each on time phase, Pin is the input power and Vpk is the peak input voltage from the mains supply) from which it can be seen that for low duty cycles, caused by a small difference between Vo and $V_{IN}$, the power losses through the power switch are considerably less than would be the case otherwise.

Figure 4:
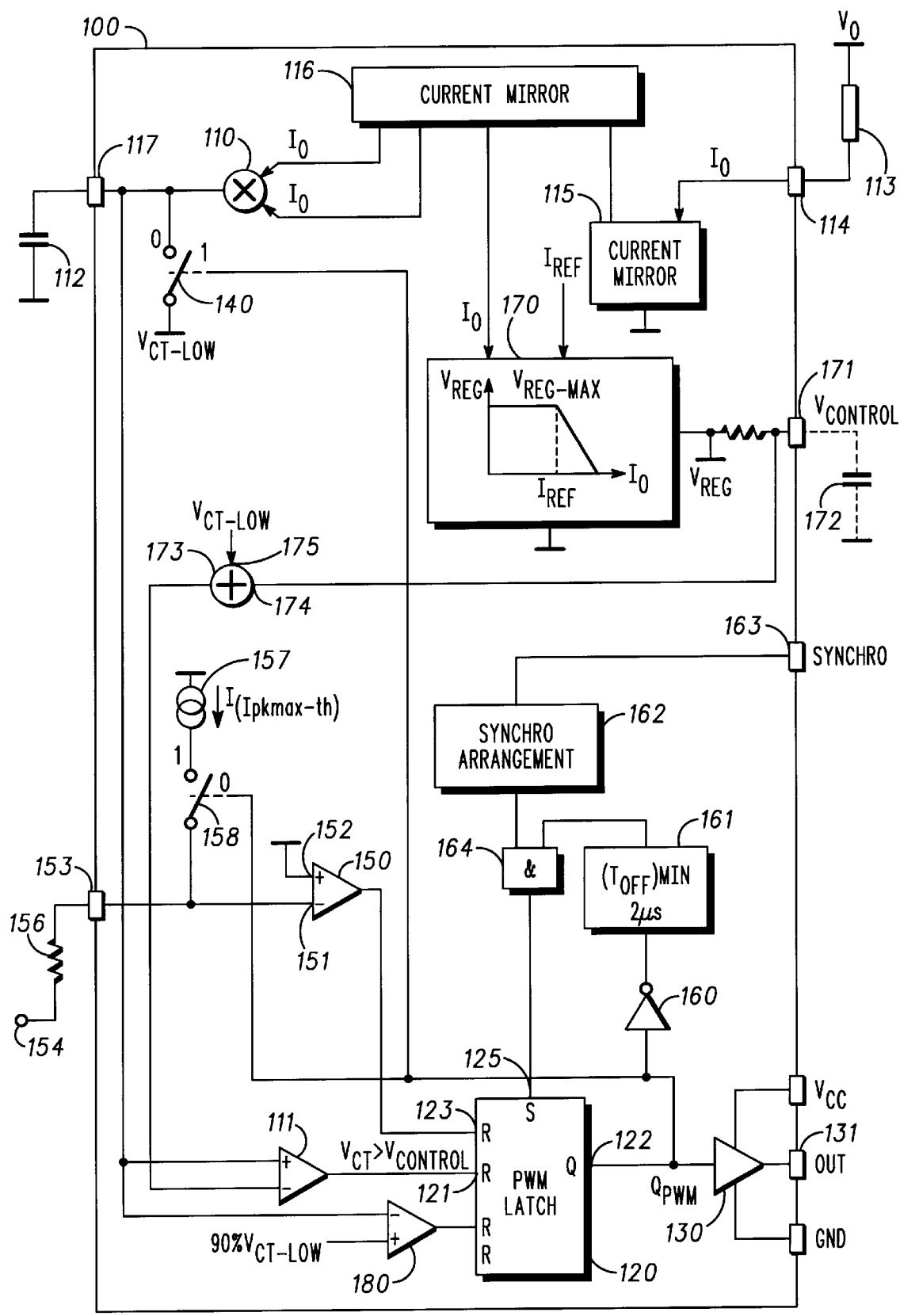
FIG. 4 is a schematic diagram of a power factor correction controller circuit according to the present invention.

Referring now to FIG. 4, there is shown a pfc controller circuit 100 having on time determination means 110, 111, 112, 113 114, 115, 116, 117. The on time determination means essentially comprises an on time resistor 113 (having resistance Ro) connected between Vo and ground via an input terminal 114. In this way, a current signal having a value of Io is produced. The on time determination means further comprises an on time capacitor 112 (having capacitance $C_T$) and being connected, via terminal 117, between ground and the output of a multiplier 110. The inputs to multiplier 110 are two currents each of whose magnitude Io is substantially proportional to Vo (Io≈Vo/Ro), Io corresponding to the current flowing through on time resistor 113. The input currents to the multiplier are supplied by a current mirror arrangement comprising current mirrors 115, 116 which act as multiple sources or sinks respectively of currents equal to the current Io flowing through resistor 113 in a known manner.

The output current is then applied to on time capacitor 112 via an on time capacitor terminal 117. The voltage $V_{CT}$ across the capacitor increases at a rate which depends upon Io and the capacitance $C_T$ of on time capacitor 112 ($V_{CT}$= I.t/$C_T$, where I=KM$^x$ Io$^2$ is the output current from multiplier 110, the term KM being the multiplier gain).

The voltage across the capacitor is applied to a comparator 111 where it is compared with a reference voltage Vref which is generated by the pfc controller 100 in a manner which will be described in greater detail below. Clearly for a given value of $C_T$, Ro, Vref and $V_{CT-LOW}$, where $V_{CT-LOW}$ is the voltage across on time capacitor 112 before charging of the capacitor 112 is commenced (in fact $V_{CT-LOW}$ is a reference voltage generated by the pfc controller 100 which is connected to on time capacitor 112 in between each charging phase), the time $t_{CT}$ taken for the voltage across capacitor 112 to equal Vref will be inversely proportional to the square of Vo ($t_{CT} \approx \{C_T \cdot Ro^2 (Vref - V_{CT-LOW})\} / (KM \times Vo^2)$)

The output of comparator 111 is applied to a reset input 121 of an RS flip-flop 120. An output terminal 122 of the flip-flop 120 is used to drive the output 131 of the pfc controller 100 via a suitable buffer 130. The output terminal 122 of flip-flop 120 is also connected to a switch 140 which connects the output of multiplier 110 (and thus the plate of capacitor 112 which is not connected to ground) to $V_{CT-LOW}$ when output terminal 122 of flip-flop 120 is low. Thus, when output terminal 122 of flip-flop 120 is low, capacitor 112 discharges via switch 140 to voltage $V_{CT-LOW}$.

An off time determination means 150, 151, 152, 153, 154 is also provided in the form of current measurement means which measures the current flowing through the pfc circuit by measuring the voltage across the in-rush resistor 70 via a connection terminal 154 adapted for connection to the end of in-rush resistor 70 not connected to ground and a current sense terminal 153 to the integrated circuit of the pfc controller 100. The voltage sensed at terminal 154 is input to an inverting input 151 of a voltage comparator 150 where it is compared with a threshold reference voltage which is input to the non-inverting input 152 of the comparator 150. When the pfc controller is operating in a critical discontinuous mode, the off time determination means acts to switch power switch 40 back on again as soon as the current flow through the pfc circuit reaches zero. Thus to operate in a critical discontinuous mode the threshold reference voltage is fixed at a fairly low magnitude (e.g. −50 mV or +50 mV). Comparator 150 is arranged to go low when the magnitude of the voltage across the in-rush resistor 70 falls below the magnitude of the threshold reference voltage. By connecting the output of this comparator to another reset input terminal 123 of flip-flop 120, the output terminal 122 of flip-flop 120 can be prevented from going high again after one on phase has ended until the current flow across in-rush resistor 70 has substantially ceased. Clearly the off time determination means must be prevented from resetting flip-flop 120 while the flip-flop output terminal 122 is high.

This is conveniently achieved in the present embodiment by further providing an over-current voltage-offset generator 156, 157, 158, as part of the current measurement means. The over-current voltage-offset generator essentially comprises an over-current resistor 156 located between terminals 153 and 154 and a switch 158 for switching a constant current source 157 into connection with the over-current resistor 156 for generating an offset voltage thereacross. The switch 158 is controlled by the output terminal 122 to ensure that the over-current voltage -offset generator is only switched on during each on phase. In this way, during each on time phase e the e voltage at input terminal 151 will be maintained higher than the threshold reference volt age in put to terminal 152 unless the negative voltage at terminal 154 exceeds the offset voltage generated across over-current resistor 156 (minus the threshold reference voltage—e.g. minus −50 mV or +50 mV). Thus unless the current across the in-rush resistor 70 exceeds a predetermined maximum value, the output of comparator 150 will remain low. This ensures that the on phase is not cut short by the off time determination means unless an over-current is detected.

It will be appreciated that the above described arrangement is particularlyadvantageous because it needs only a single pin to perform the functions of zero-current detection and programmable over current detection. The reason that it is able to perform both these functions using a single pin is that the offset-voltage created by the injection of a current across the over-current resistor 156 is added to the detected voltage as opposed to the reference voltage. In this way a single pin can be connected to the in-rush resistor via the over-current resistor. Of course, if more than one pin was available in a particular application, it would be possible to use a separate pin for connection to the over-current resistor 156 such that the offset voltage generated across the over-current resistor 156 could be added to or subtracted from either the detected voltage across the in-rush resistor or the reference voltage, to achieve the same effect.

Clearly the over-current detection means formed in this way may be initially set or programmed to detect whatever maximum current is desired to be detected and whatever the exact resistance of in-rush resistor 70 by selecting an appropriate value f or the over-current resistor 156 so as t o enable the pfc controller to be used in a wide variety of applications. In this way, the over-current voltage offset generator can be thought of as a programmable means for enabling programmable over-current detection.

The off-time determination means and the over-current detection means as described in the present embodiment shown in the accompanying drawings use negative current sensing. However, it will be appreciated by a person skilled in the art that the same could be done using positive current sensing by, for example, connecting the grounded terminal of the power switch 40 to the grounded plate of the capacitor 60 to form a common point between the power switch 40 and the capacitor 60 and by inserting the in-rush resistor between this obtained common point (this common point being used for the current sensing) and ground.

In addition to the above described off time determination means 150, 151, 152, 153, 154, for operating the pfc controller in a critcal discontinuous mode, the presently preferred embodiment shown in FIG. 4 further includes more conventional minimum off time determination means 160, 161 and synchronised off time determination means 162, 163. Both the minimum and the synchronised off time determination means feed via an and gate 164 to the set input terminal 125 of RS flip-flop 120. If no synchronising signal is supplied to synchro terminal 163, then synchro arrangement means 162 simply continuosly outputs to and gate 164 a high output. Minimum off time determination means 160, 161 simply comprises an inverter 160 coupled to a short delay circuit 161 (e.g. 2 microseconds) connected between the output terminal 122 of the flip flop 120 and the and gate 164. In this way, as will be clear to a person skilled in the art, a minimum off time duration corresponding to the delay of the short delay circuit 161 is provided which will always prevent any other off time determination means from restarting an on phase before this minimum off time determination means has elapsed.

The synchronised off time determination means enables the duration of each off time phase to be determined by a more conventional synchronisation signal applied to synchro terminal 163 in a manner well known to those skilled in the art.

The pfc controller 100 further comprises a voltage regulator which acts to prevent the output voltage Vo from exceeding a predetermined maximum value. The voltage regulator essentially comprises an adaptive reference voltage generation means 170 which receives as inputs a first current signal lo which is substantially proportional to the output voltage Vo, and a reference current signal Iref. The adaptive reference voltage generation means 170 outputs a voltage signal Vreg which is substantially constant at a value Vreg-max for values of lo below Iref and at a value of zero for values of lo greater than about 1.025 Iref with Vreg varying linearly between these two values of lo. The voltage signal Vreg is preferably stabilised by connecting it via a control terminal 171 to a control capacitor 172 connected to ground for filtering out any unwanted ac components in Vreg. This stabilised Vreg signal is then input to an adder 173 at a first input 174, together with a voltage signal of magnitude $V_{CT-LOW}$ to produce at an output of the adder the reference voltage Vref which is compared, by comparator 111, with the voltage across on time capacitor 112 as described above.

Clearly, the value of on time resistor can be set to determine what value lo will take for a particular value of Vo, which will in turn determine the maximum output voltage Vo allowable by the voltage regulator. Once the value of on time resistor 113 has been set, the rate at which the on time capacitor 112 charges can be set by selecting the appropriate capacitance of the capacitor 112.

Finally, the pfc controller 100 of FIG. 4 further includes a safety comparator 180 which compares the voltage at on time capacitor terminal 112*a* with a reference voltage slightly less than $V_{CT-LOW}$. If the voltage at terminal 112*a* ever falls below this reference voltage, pfc controller output 131 is held low. This prevents a dangerous permanent on time phase which might otherwise occur if terminal 112*a* was accidentally connected to ground.

Figure 5:
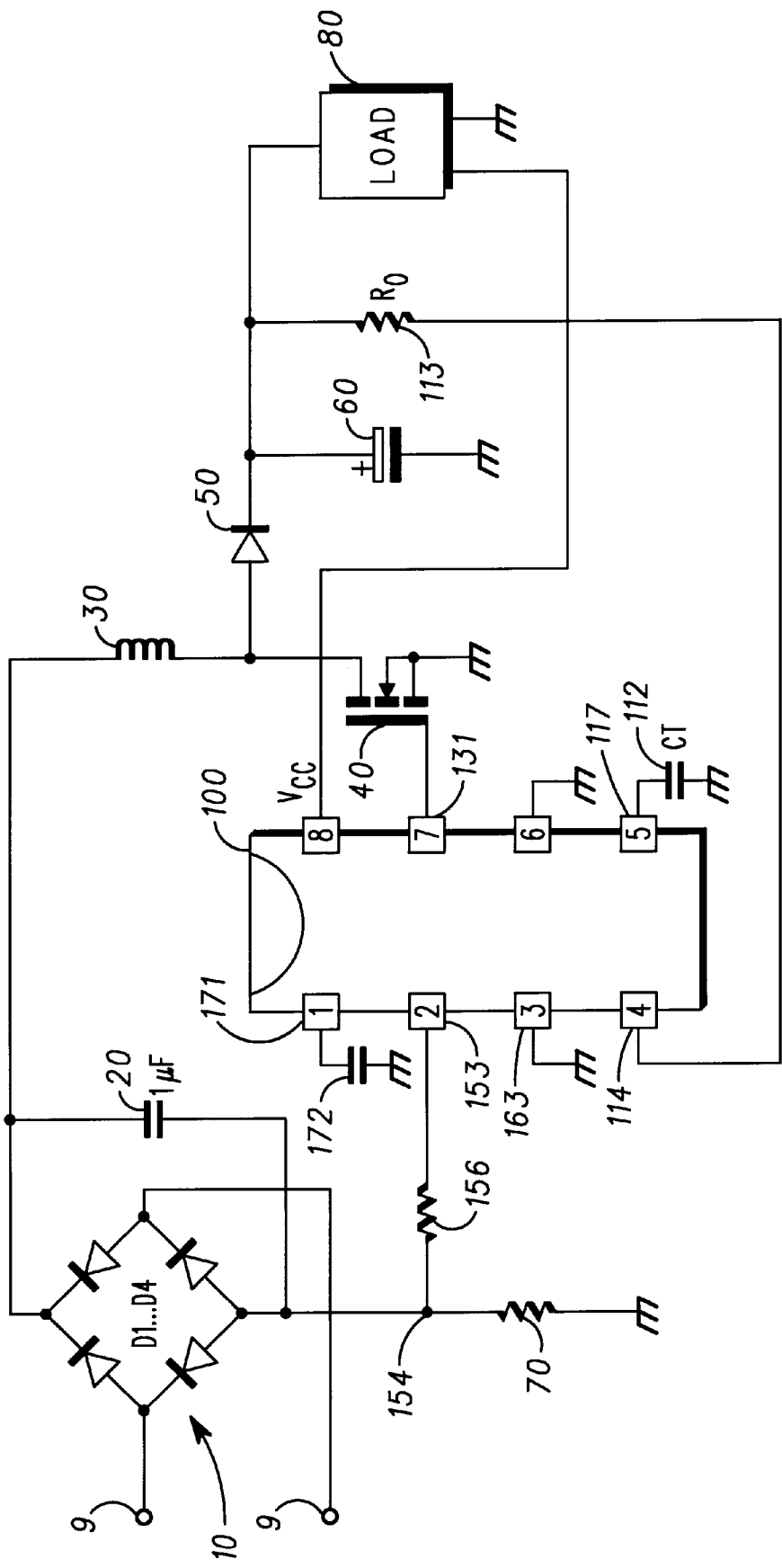
FIG. 5 is a schematic diagram of a power factor correction circuit incorporating the controller circuit of FIG. 4.

Referring now to FIG. 5, there is shown an example of the pfc controller circuit 100 in a typical pfc circuit. The arrangement is clearly similar to that of FIG. 1 but shows the pfc controller circuit 100 in the form of an integrated circuit in an eight pin package. External on time resistor 113 and on time capacitor 112 are shown in addition to a load 80 from which the power supply Vcc of the controller 100 is drawn. The load 80 may, for example, be a switch mode power supply or a lamp ballast.

Also shown is the control capacitor 172 and the over-current resistor 156.

It will be appreciated by a person skilled in the art that alternate embodiments to the one described above are possible. For example, lo is described as corresponding to Vo/Ro but, of course, an offset voltage v could easily be added to or subtracted from Vo prior to measuring the current flowing across Ro. Such an arrangement would give rise to a current lo given by lo=(Vo−v)/Ro. Furthermore, a positive or negative current offset could be added to lo in order to build an offset on Vo. Furthermore, instead of using a capacitor 112 and resistor 113 as part of the on time determination means to produce a duration which varies in an inverse dependence on Vo, an alternative arrangement could be used having similar properties.

Also, although the pfc controller of the preferred embodiment has been described as comprising an integrated circuit together with a few external components (eg the on time capacitor 112, on time resistor 113, control capacitor 172 and over-current resistor 156) this is done primarily for convenience and flexibility of various properties of the pfc controller which enable a single integrated chip to be used in a number of different applications having different requirements (e.g. maximum current flow etc). It will be recognised by a person skilled in the art that it would be equally possible to provide one or more of these external components on the integrated circuit and that this will be particularly advantageous where a large number of pfc controllers will be required for a single application.

Additionally, the currently preferred embodiment described above discloses an analog circuit. However, it will be apparent to a person skilled in the art that the same functions could be achieved using digital electronic solutions. For example, an analog to digital converter could be used to produce a digital signal representative of Vo which is then manipulated digitally according to a suitable algorithm to produce a pulse whose width is in an inverse dependence to the value of Vo. Similarly, a current measurement means could be provided in a digital form by using an analog to digital converter to produce a digital signal representative of the current flowing across the in-rush resistor, and processing this digital signal to provide for both zero current detection and programmable over current detection and to cause either termination of the off time phase or on time phase respectively upon such detection.

Furthermore, the preferred embodiment has described a pfc controller formed on an integrated circuit with separate functions such as the power switch or a Swith Mode Power Supply being formed separately. However, it will be apparent to a person skilled in the art that separate functions could in certain circumstances be integrated into the same circuit. Alternatively, some of the functions shown as being incorporated on a single integrated circuit as part of the pfc controller 100 could actually be performed on separate circuits.

What is claimed is:

1. A regulator circuit in a follower boost power conversion system which provides an output feedback signal from an output of the follower boost power conversion system, comprising:

a pulse width modulator coupled for receiving the output feedback signal and devoid of receiving a feedforward signal from an input of the follower boost power conversion system to increase and decrease a duty cycle of an output signal of the regulator circuit;

a multiplier having first and second inputs receiving the output feedback signal to provide a square of the output feedback signal and having an output coupled to a capacitive node;

a comparator having a first input coupled to the capacitive node for receiving the square of the output feedback signal and a second input coupled for receiving a reference signal; and a latch having an input coupled to an output of the comparator and having an output for providing the output signal of the regulator circuit.

2. A method of regulating a follower boost power conversion system, comprising:

controlling a duty cycle of an output signal of a regulator circuit in response to an output feedback signal from an output of the follower boost power conversion system, wherein the regulator circuit is devoid of receiving a feedforward signal from an input of the follower boost power conversion system to increase and decrease the duty cycle of the output signal of the regulator circuit;

multiplying the output feedback signal with itself to provide a square of the output feedback signal;

charging a capacitive node with the square of the output feedback signal;

comparing the square of the output feedback signal to a reference signal to provide a compare signal; and latching the compare signal as the output signal of the regulator circuit.

3. A regulator circuit in a follower boost power conversion system, comprising:

a multiplier having first and second inputs receiving an output feedback signal from an output of the follower boost power conversion system to provide a square of the output feedback signal and having an output coupled to a capacitive node; and a pulse width modulator having an input coupled to the capacitive node for receiving the square of the output feedback signal and devoid of receiving a feedforward signal from an input of the follower boost power conversion system to increase and decrease a duty cycle of an output signal of the regulator circuit;

a comparator having a first input coupled to the capacitive node for receiving the square of the output feedback signal and a second input coupled for receiving a reference signal; and a latch having an input coupled to an output of the comparator and having an output for providing the output signal of the regulator circuit.

* * * * *